United States Patent
Kubota

(10) Patent No.: US 7,533,200 B2
(45) Date of Patent: May 12, 2009

(54) PRINTER, PROCESSING METHOD, PROGRAM, AND STORAGE MEDIUM

(75) Inventor: Tsutomu Kubota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 11/303,886

(22) Filed: Dec. 16, 2005

(65) Prior Publication Data

US 2006/0136616 A1    Jun. 22, 2006

(30) Foreign Application Priority Data

Dec. 21, 2004  (JP) ............................. 2004-369434
Nov. 15, 2005  (JP) ............................. 2005-330249

(51) Int. Cl.
    *G06F 3/00*    (2006.01)
(52) U.S. Cl. ...................... 710/36; 358/1.14; 358/1.15; 709/225; 709/229
(58) Field of Classification Search ........................ None
    See application file for complete search history.

(56) References Cited

U.S. PATENT DOCUMENTS 5,534,974 A * 7/1996 Hasegawa ...................... 399/1

7,102,771 B2 * 9/2006 Lewis et al. ................ 358/1.14
7,151,613 B1 * 12/2006 Ito ............................. 358/1.15
2006/0080330 A1 * 4/2006 Sugino ........................ 707/100

FOREIGN PATENT DOCUMENTS

JP    5-027925 A    2/1993

OTHER PUBLICATIONS

RD 448067A, Aug. 2001, Ring et al.*

* cited by examiner

*Primary Examiner*—Eron J Sorrell
(74) *Attorney, Agent, or Firm*—Canon U.S.A., Inc. I.P. Division

(57) ABSTRACT

A printer configured to communicate with an external information processing apparatus includes a storage device that stores level information representing whether processing required in accordance with data received from the external information processing apparatus is permitted or not, and a processor that performs processing for the received data in accordance with the level information stored in the storage device.

18 Claims, 5 Drawing Sheets

| INTERFACE | OPERATION LEVEL |
|---|---|
| CENTRONICS | 1 |
| USB | 3 |
| NETWORK | 4 |
| EXPANSION | 2 |

FIG. 5

| INTERFACE | OPERATION LEVEL | OPERABLE PERIOD | OPERATION WHEN DATA IS INPUT |
|---|---|---|---|
| CENTRONICS | 1 | | |
| USB | 4 | 9:00 - 17:00 | REPORT TO ADMINISTRATOR VIA MAIL |
| NETWORK | 4 | 0:00 - 24:00 | |
| EXPANSION | 2 | | REPORT TO ADMINISTRATOR VIA MAIL |

PRINTER, PROCESSING METHOD, PROGRAM, AND STORAGE MEDIUM

BACKGROUND OF THE INVENTION

1. Field of the Invention

The present invention relates to printers capable of easily restricting processing required in accordance with input data when the data is input from an external apparatus, for example, to a mechanism for restricting an operation of a printer when data is input to an interface from among a plurality of interfaces.

2. Description of the Related Art

Printers including a plurality of interfaces have been available. In such printers including a plurality of interfaces, when print data is input to different interfaces in parallel, an inconvenience occurs in which outputs based on the inputs via the different interfaces are mixed together. In view of this problem, for example, Japanese Patent Laid-Open No. 5-027925 proposes a technology for regulating a receiving operation for print data received via a plurality of interfaces such that outputs based on receiving jobs of the respective interfaces are not mixed together.

In a case where a printer is installed in a public space, such as a library or a school, restricting an input via an unused interface is desired. For example, in a case where a printer is installed in a library, a restriction is placed on what users can print. In this case, for example, only a search result of a library holding list is set as an object to be printed. However, for example, if a notebook computer or the like is connected via an unused interface, such as a universal serial bus (USB), printing can be performed. As a result, invalid printing can be permitted.

In the technology disclosed in Japanese Patent Laid-Open No. 5-027925, in a case where print data is received via any interface, if other interfaces are not used, a recording operation for a recording medium is performed in accordance with the received print data. Thus, even if processing for not receiving data transmitted to a printer via a certain interface is desired, such processing cannot be performed.

In order to solve the aforementioned problem, an unused interface may be physically eliminated or an interface circuit may be disconnected. However, if processing for simply making an interface unusable is performed, for example, an unused interface cannot be used for any purpose. Thus, a function of a printer cannot be satisfactorily implemented.

SUMMARY OF THE INVENTION

The present invention provides a mechanism for easily restricting processing required in accordance with input data when the data is input from an external apparatus.

According to an aspect of the present invention, a printer capable of communicating with an external information processing apparatus may include a storage device that stores level information representing whether processing required in accordance with data received from the external information processing apparatus is permitted or not, and a processor that performs processing for the received data in accordance with the level information stored in the storage device.

Accordingly, since level information representing whether processing required in accordance with data received from an external information processing apparatus is permitted or not is stored and processing for the received data is performed in accordance with the stored level information, a mechanism for readily restricting an input via an interface while satisfactorily implementing a function of a printer can be realized.

Other features and aspects of the present invention will be apparent from the following description taken in conjunction with the accompanying drawings, in which like reference characters designate the same or similar parts throughout the figures there.

BRIEF DESCRIPTION OF THE DRAWINGS

FIG. 5 shows exemplary settings for operations of the interfaces according to a second embodiment.

DESCRIPTION OF THE EMBODIMENTS

Various embodiments, features and aspects of the present invention will now be described in detail with reference to the drawings. It should be noted that the relative arrangement of the components, the numerical expressions and numerical values set forth in these embodiments do not limit the scope of the present invention unless it is specifically stated otherwise.

First Exemplary Embodiment

Figure 1:
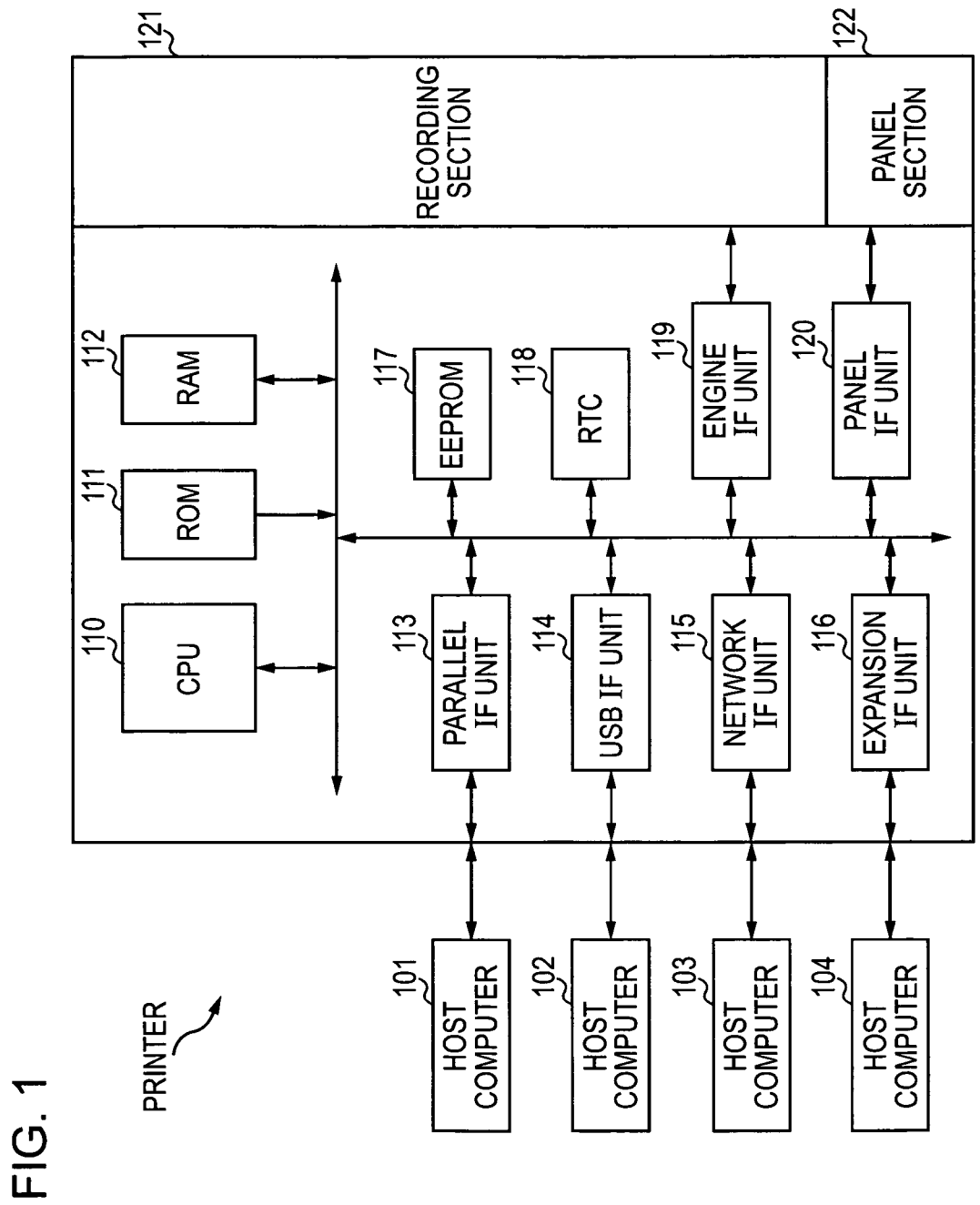
FIG. 1 shows an exemplary architecture of a printer according to embodiments of the present invention.

FIG. 1 shows an exemplary architecture of a printer according to embodiments of the present invention. Reference numerals 101 to 104 denote host computers which are described later in the specification. A CPU 110 is utilized to control the entire printer. A ROM 111 stores therein a control program and the like for the CPU 110 and font information. A RAM 112 is used as a work memory when the CPU 110 is operating and used for generating print data. A parallel interface unit 113 (e.g., a Centronics unit) controls data transmission and reception with the host computer 101 connected via a parallel interface. A USB interface unit 114 controls data transmission and reception with the host computer 102 connected via a USB interface. A network interface unit 115 controls data transmission and reception with the host computer 103 connected via a network interface. An expansion interface unit 116 controls data transmission and reception with the host computer 104 connected via an expansion interface.

A nonvolatile memory 117 (electrically erasable programmable read-only memory (EEPROM)) stores setting information and the like. A real time clock (RTC) 118 functions as a timing circuit unit for measuring time. An engine interface unit 119 controls communication with a recording section 121 actually performing printing on paper and outputs print data. A panel interface unit 120 interfaces with a panel section 122. The recording section 121 receives print data while measuring timing via the engine interface unit 119 and actually performs printing on paper. The panel section 122 includes a display and a switch for interfacing between the apparatus and a user.

Figures 2, 3:
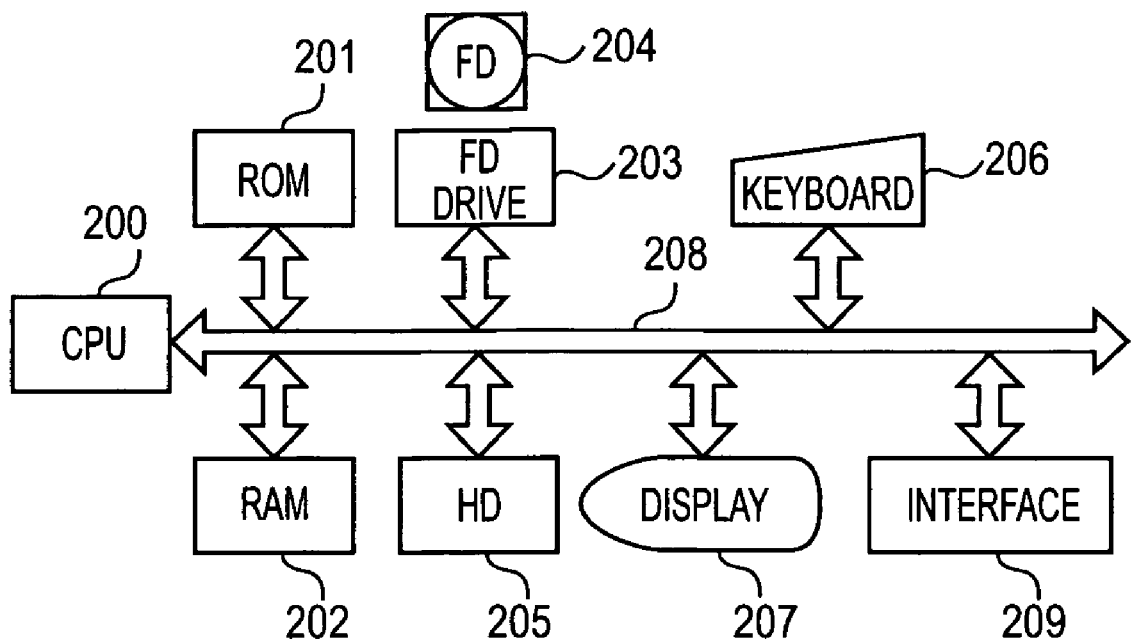
FIG. 2 is a block diagram showing an exemplary host computer according to the embodiments of the present invention.
FIG. 3 shows exemplary settings for operations of interfaces according to a first embodiment.

FIG. 2 is a block diagram showing a representative example of the architecture of the host computers 101 to 104. A central processing unit (CPU) 200 functions as a control unit of an information processing apparatus. The CPU 200 executes an application program, a printer driver program, an operating system (OS), a network printer control program, and the like stored in a hard disk (HD) 205. The CPU 200 also temporarily stores information, files, and the like necessary for execution of such programs in a random-access memory (RAM) 202.

A read-only memory (ROM) 201 stores therein programs, such as a basic input/output program, and various data, such as font data used for document processing and template data. The RAM 202, which is a temporarily storing unit, functions as a main memory, a work area, and the like of the CPU 200. A flexible disk (FD) drive 203 is capable of loading a program and the like stored in a flexible disk (FD) 204, which is a storage medium, via the FD drive 203 to the computer system, as shown in FIG. 5. The FD 204, which is a storage medium, stores therein a computer-readable program. Any medium, such as a compact disk read-only memory (CD-ROM), a CD-recordable (CD-R), a CD-ReWritable (CD-RW), a PC card, a digital versatile disk (DVD), an integrated circuit (IC) memory card, a magneto-optical (MO) disk, or a memory stick, may be used as a storage medium.

The HD 205 is one of external storage devices and functions as a mass memory. An application program, a printer driver program, an OS, a network printer control program, a related program, and the like are stored in the HD 205. In addition, a spooler functioning as a spool unit is stored in the HD 205. The spool unit functions as a client spooler in clients (in this case, the host computers 102 to 104) and as a server spooler in a print server (in this case, the host computer 101). In the print server (the host computer 101), a table storing job information received from the clients (the host computers 102 to 104) and performing sequence control is also generated and stored in the HD 205.

A keyboard 206 is used for inputting an instruction. A command for device control and the like are input using the keyboard 206 from a user to a client computer or from an operator or an administrator to a print server. A pointing device (not shown) for inputting an instruction may also be provided.

A display 207 displays a command input via the keyboard 206, a condition of a printer, and the like. A system bus 208 controls flow of data in the computer functioning as a client or a print server. An interface 209 connects the information processing apparatus to a network. Thus, the information processing apparatus is capable of data exchange with an external apparatus.

A plurality of operation levels can be set for the interfaces shown in FIG. 1. An example of settings of the operation levels is shown in FIG. 3. In the example shown in FIG. 3, four levels can be set. Such operation level information is stored in an EEPROM (rewritable nonvolatile storage means) 117 shown in FIG. 1. Thus, when the setting shown in FIG. 3 is once performed, even if the power of the printer is cut off, the setting shown in FIG. 3 is maintained. After the power is turned on again, the printer refers to the setting. A similar operation is also applied to settings shown in FIG. 5, which will be described below.

Still referring to FIG. 3, at operation level 1, an operation of an interface is prohibited, and a connected host cannot even recognize a printer. In other words, at operation level 1, neither processing involving a printing operation by the printer nor processing not involving a printing operation by the printer is permitted. Here, the "printing operation" means a recording operation for performing recording on a paper medium by a recording unit.

At operation level 2, although a response can be made to a connection confirmation received from a connected host, neither a setting change for an interface nor a printing operation is permitted. In other words, at operation level 2, although neither processing involving a printing operation by the printer nor setting changing processing not involving a printing operation by the printer is permitted, a part of processing not involving a printing operation, such as response processing for sending a response to a host, is permitted.

At operation level 3, although a response can be made to a connection confirmation received from a connected host and a setting change for an interface can be made by the host, a printing operation is not permitted. In other words, at operation level 3, although processing involving a printing operation by the printer is prohibited, various types of processing not involving a printing operation by the printer are permitted.

At operation level 4, a setting change for an interface can be made by a host and a printing operation can be performed. In other words, at operation level 4, various types of processing are permitted, irrespective of processing involving a printing operation or not.

An operation permitted or prohibited at each operation level shown in FIG. 3 is not limited to the operation shown in FIG. 3. For example, at operation level 3, printing in a 2in1 layout (a layout method for laying out two logical pages on a single physical page) can be printed.

The operation level information shown in FIG. 3 is merely an example. If a password or the like is used together, operation level information can be changed in accordance with an instruction from a host computer or using the panel section 122 of the printer. In particular, a setting change using the panel section 122 is necessary when the operation level is set to "1" or "2".

Here, the above-described "operation level information" means setting information representing whether or not a processing request based on input data is permitted to be executed when the data is input from an external apparatus, such as a host computer. The "operation level information" can also be called "permission setting information". In addition, although setting of operation level information (permission setting information) is represented using a number in the example shown in FIG. 3, setting of operation level information (permission setting information) is not necessarily represented using a number. In other words, for example, a description, such as "ON" or "OFF" of a predetermined bit or "operation is prohibited", may be provided as long as the printer can interpret or analyze which operation is permitted from the information. Hereinafter, descriptions will be given using the term "operation level information" (or the abbreviation "level information").

An exemplary process performed by the printer in accordance with an operation level set for each interface (as shown in FIG. 3) when an external host computer accesses the printer via the interface is described next with reference to FIG. 4.

Figure 4:
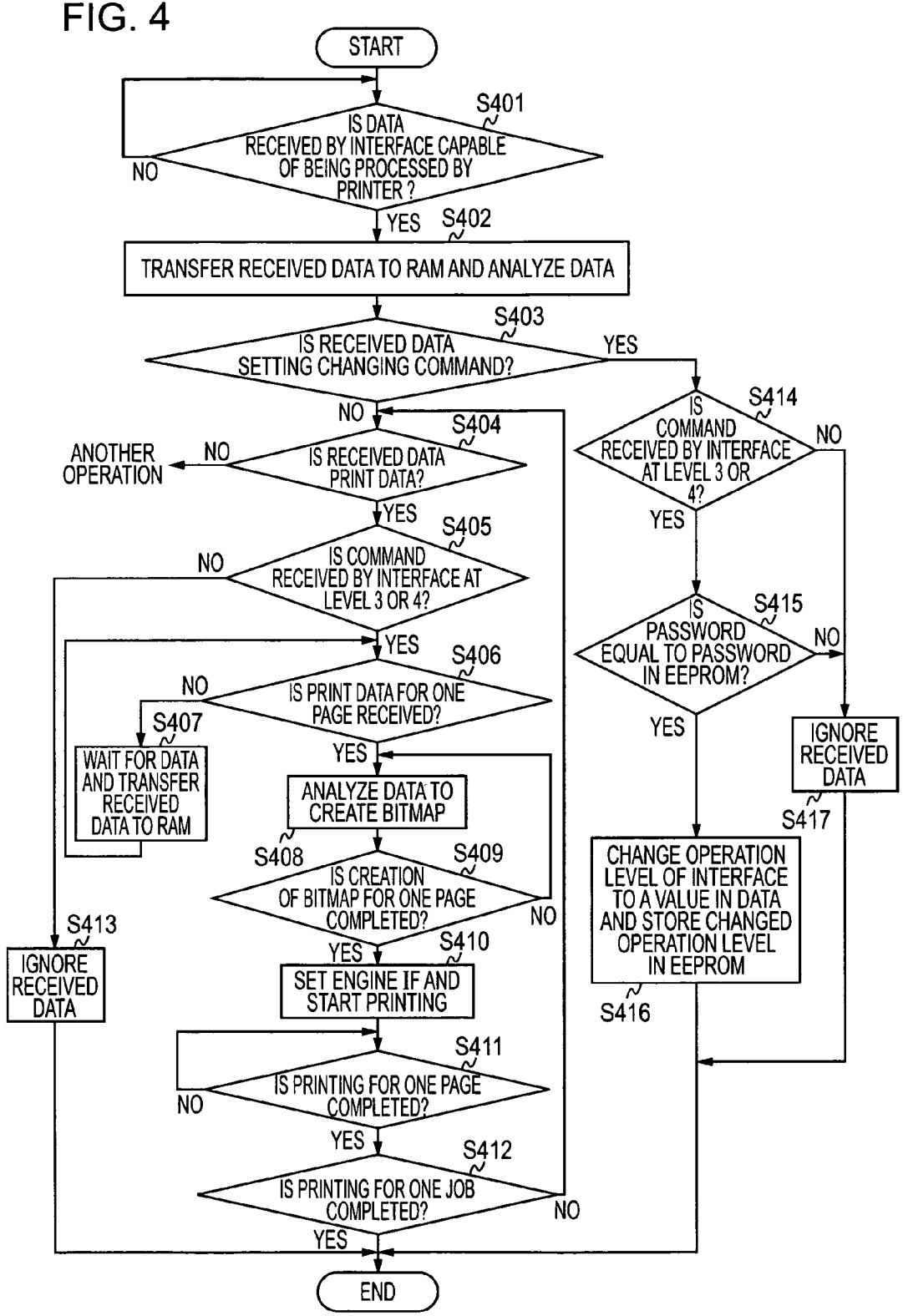
FIG. 4 is a flowchart showing an exemplary process performed by a CPU according to the first embodiment.

FIG. 4 is a flowchart showing an exemplary process performed by the printer that can communicate with a host computer, which is an information processing apparatus, via a predetermined interface. The process for received data is performed in accordance with level information stored in the EEPROM 117 and representing whether processing required in accordance with the received data is permitted or not.

The process is initiated (step S401) by determining whether data received by any one of I/F 113 through 116 (from FIG. 1) is capable of being received by the printer 121. Various scenarios for each I/F are now herein discussed below.

[Receiving Data at the Parallel I/F]

The operation level of the parallel interface unit 113, such as a Centronics interface unit, connected to the host computer 101 shown in FIG. 1 is set to "1". Thus, if any data access from the host computer 101 exists, data cannot be received. Therefore, at step S401, the received data is not capable of being further processed by the printer 121 (i.e., NO) and the process returns to beginning of the process. Here, data reception is prohibited by keeping a BUSY signal for the host computer 101 at high in the parallel interface unit 113 such that data reception from the host computer 101 is not permitted. For another interface, data may be once received, and then the received data may be disposed of.

[Receiving Data at the Expansion I/F]

The operation level of the expansion interface unit 116, which is generally provided for expanding an interface used in a host computer and has a data transmission and reception function, connected to the host computer 104 is set to "2". For example, when a board connected to the expansion interface has a network function, although a response can be made to a PING received from the host computer 104, no operation is performed in response to other operation requests. Therefore, at step S401, the received data is not capable of being further processed by the printer 121 (i.e. NO) and the process returns to beginning of the process. Instead, here the CPU 110 analyzes data received at the expansion interface unit 116 (a command transmitted from the host computer 104) and determines whether or not to operate in response to the command. When a setting changing command or a printing command is received from the host computer 104, such data is disposed of and no operation is performed.

[Receiving Data at the USB I/F]

The operation level of the USB interface unit 114 connected to the host computer 102 is set to "3". When the USB interface unit 114 connected to the host computer 102 receives a setting changing command from the host computer 102, the USB interface unit 114 generates an interrupt and reports to the CPU 110 reception of the data from the host computer 102 (step S401). Therefore, at step S401, the received data is capable of being received (i.e. "YES") and the process continues to step S402.

Next, the CPU 110 transfers the received data to the RAM 112 and analyzes the received data (step S402). If the CPU 110 determines that the received data is a setting changing command for the interface (i.e., the determination in step S403 is YES, the process proceeds to step S414. Since the operation level of the USB interface unit 114 in this case is set to "3", the received data related to setting changing is valid (the determination in step S414 is YES). The CPU 110 compares a password indicated after the setting changing command with a password stored in the EEPROM 117 (step S415). If the passwords are equal to each other (if the determination in step S415 is YES), the operation level is changed (step S416). Thereafter, the process then ends. In contrast, if the command received by the I/F is not at level "3" or "4" (if the determination is No at step S414, or if the passwords are not equal to each other (if the determination in step S415 is NO), the received command is ignored (step S417). Thereafter, the process then ends.

It is noted that the USB interface unit 114 may prohibit data reception from a host computer, for example, by not sending an acknowledgement in response to an SOF packet received from the host computer. However, after this processing, it is difficult to change setting so as to communicate with the host computer. Thus, normally, similar to a case for a network, a received command is analyzed, and it is determined whether to process or ignore the command in accordance with the setting.

When the USB interface unit 114 connected to the host computer 102 receives print data instead of a setting changing command from the host computer 102, the USB interface unit 114 generates an interrupt and reports, to the CPU 110, reception of the data from the host computer 102 (step S401). The CPU 110 then transfers the received data to the RAM 112 (step S402). When the CPU 110 analyzes the received data stored in the RAM 112 and determines that the received data is print data (if the determination in step S403 is NO and the determination in step S404 is YES), the CPU 110 determines whether or not the level of the interface that receives the data is set to "3" or "4" (step S405).

If the determination in step S405 is NO, received data is overwritten until a command other than print data is received, and the received data is ignored (step S413). Thereafter, the process then ends. In the case shown in FIG. 3, since the operation level of the USB interface unit 114 is set to "3", the determination in step S405 is YES, and therefore, the process proceeds to step S406.

In step S406, it is determined whether print data for one page has been received or not. After completing reception of print data for one page (if the determination in step S406 is YES), the CPU 110 analyzes the print data transferred to the RAM 112, converts the print data into bitmap data using font data stored in the ROM 111, and writes the bitmap data in the RAM 112 (step S409).

If the determination in step S406 is NO, the CPU 110 transfers data continuously received at the USB interface unit 114 to the RAM 112 (step S407). Then, processing in step S406, steps S408 to S412, and steps S404 to S405 are repeated until printing processing for one print job is completed. That is to say, after completing creation of bitmap data for one page (step S409), the CPU 110 sets the engine interface unit 119 for a start address or the like of the bitmap data, and starts a printing operation (step S410). If printing for one page is completed (if the determination in step S411 is YES) and printing for one job is completed (if the determination in step S412 is YES), the process terminates.

[Receiving Data at the Network I/F]

The operation level of the network interface unit 115 connected to the host computer 103 is set to "4". Thus, operations based on a setting changing command and a print data command can be performed. When the network interface unit 115 receives a setting changing command from the host computer 103, the network interface unit 115 generates an interrupt and reports, to the CPU 110, reception of the data from the host computer 103 (step S401). The CPU 110 transfers the received data to the RAM 112 and analyzes the received data (step S402). The CPU 110 determines whether or not the received data is a setting changing command for the interface (step S403). If the determination in step S403 is YES, since the operation level of the network interface unit 115 is set to "4", the received data related to setting changing is valid (the determination in step S414 is YES). The CPU 110 compares a password indicated after the setting changing command with a password stored in the EEPROM 117 (step S415). If the passwords are equal to each other (if the determination in step S415 is YES), the operation level is changed (step S416). Thereafter, the process then ends. If the passwords are not equal to each other (if the determination in step S415 is NO), the command is ignored (step S417). Thereafter, the process then ends.

When the network interface unit 115 receives print data, the network interface unit 115 generates an interrupt and reports, to the CPU 110, reception of the data from the host computer 103 (step S401). The CPU 110 transfers the received data to the RAM 112 (step S402). After receiving data for the first page, the CPU 110 analyzes the received data (step S402). The CPU 110 determines that the received data is a printing command (the determination in step S403 is NO and the determination in step S404 is YES).

If the determination in step S405 is YES and the determination in step S406 is YES, the CPU 110 analyzes the received print data, converts the received print data into bitmap data using font data stored in the ROM 111, and writes the converted bitmap data in the RAM 112 (step S408). In addition, the CPU 110 performs analysis, creates bitmap data, and writes the bitmap data in the RAM 112 (step S408).

If print data for one page has not been received (it is determined NO at step S406), the CPU 110 transfers data continuously received at the network interface unit 115 to the RAM 112 (step S407).

If creation of bitmap data for one page is completed (if the determination in step S409 is YES), the CPU 110 sets the engine interface unit 119 for a start address or the like of the bitmap data, and starts a printing operation (step S410). The engine interface unit 119 communicates with the recording section 121, and outputs video data while measuring timing. The recording section 121 performs a printing operation while turning on and off lasers in accordance with the received video data. If printing for one page is completed (if the determination in step S411 is YES) and printing for one job is completed (if the determination in step S412 is YES), the process terminates. If printing for one page is not completed (if the determination in step S411 is NO), the process waits until printing for one page is completed, before proceeding to step S412. Moreover, if printing for one job is not completed (if the determination in step S412 is NO), then the process returns to step S404.

As described above, according to the first embodiment, a mechanism for restricting an input via an interface while satisfactorily implementing a function of a printer can be realized.

In addition, a problem in which when an interface is simply made unusable, for example, an unused interface cannot be used for any purpose and a function of a printer cannot be satisfactorily implemented can be prevented. Moreover, an operation, for example, for permitting changing of various settings and prohibiting a printing operation (for example, pull printing) can fit more with what users wish.

Second Exemplary Embodiment

A second exemplary embodiment will now be herein described. In each interface, a default setting condition, an operable period, and an operable condition can be registered. In other words, an operation performed in a case where operation setting for a designated period and operation setting for a time other than the designated period are provided is described next.

FIG. 5 shows an example of operation levels stored in the EEPROM 117 in the second embodiment. As in the example shown in FIG. 3, an operation permitted or prohibited in accordance with each operation level shown in FIG. 5 is not limited to the operation shown in FIG. 5. For example, at operation level 3, although pull printing using an operation panel of a printer may be permitted, push printing from a host computer may not be permitted.

A process performed by the printer in accordance with an operation level set for each interface shown in FIG. 5 when an external host computer accesses the printer via the interface is described next. In some cases, description will be given with reference to steps in a flowchart shown in FIG. 6.

Figure 6:
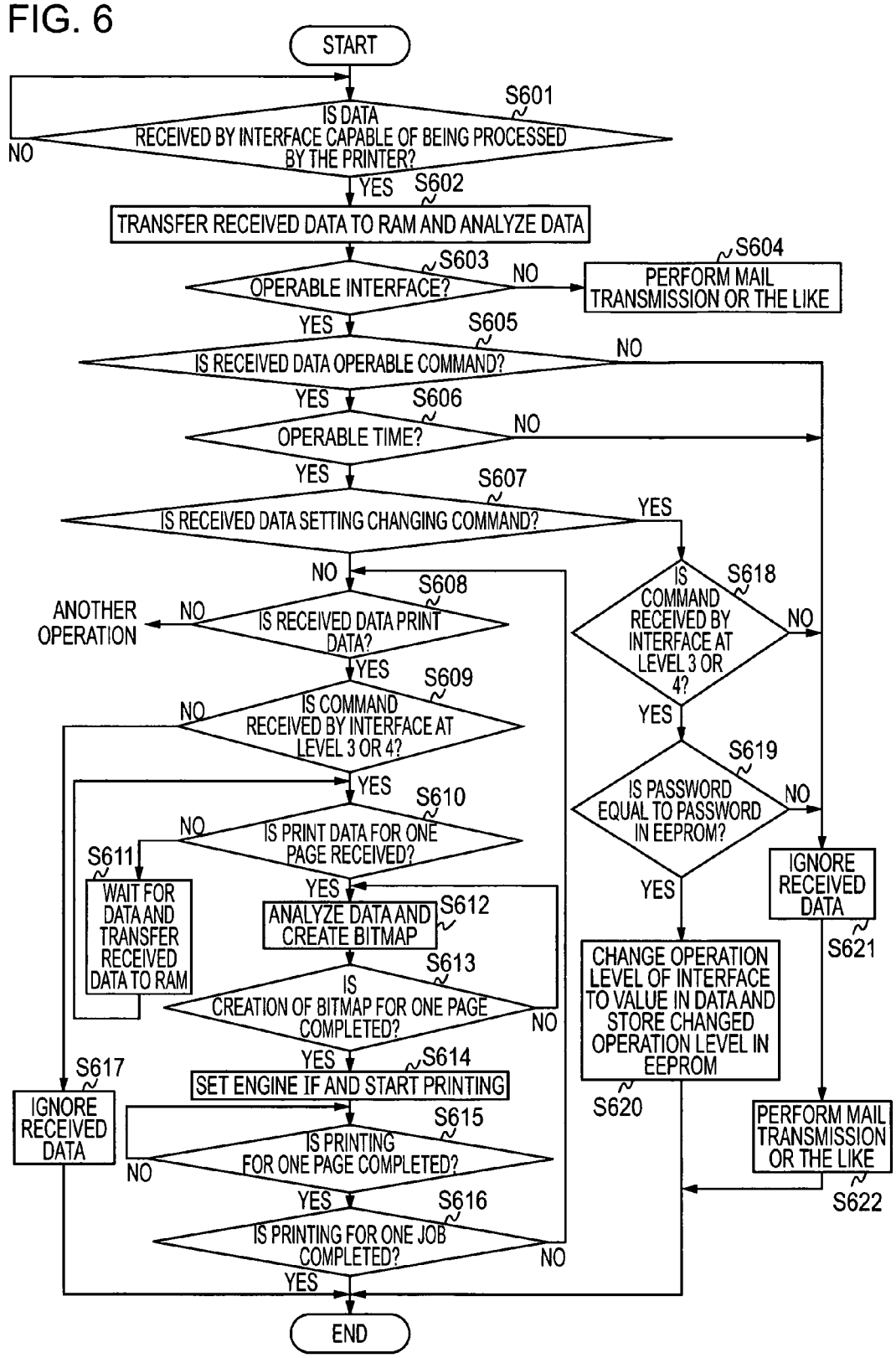
FIG. 6 is a flowchart showing an exemplary process performed by the CPU according to the second embodiment.

FIG. 6 is a flowchart showing an exemplary process performed by the printer that can communicate with a host computer, which is an information processing apparatus, via a predetermined interface. The process for received data is performed in accordance with operation levels corresponding to a measured time and a stored time when data is received from a host computer in a case where the correspondence between a time and an operation level is stored in the EEPROM 117.

[Receiving Data at the Parallel I/F]

The operation level of the parallel (e.g., Centronics) interface unit 113 is set to "1", and any operation is prohibited. Thus, an operable period is not designated. Therefore, at step S401, the received data is not capable of being further processed by the printer (i.e. "NO") and the process returns to beginning of the process.

[Receiving Data at the Expansion I/F]

The operation level of the expansion interface unit 116 is set to "2". At operation level 2, although a response can be made, neither changing of operation setting nor a printing operation is permitted. Thus, an operable period is not designated for the expansion interface unit 116. Therefore, at step S401, the received data is not capable of being further processed by the printer (i.e. "NO") and the process returns to beginning of the process. Instead, in this embodiment, when any operation command is received at the expansion interface unit 116, since "report to an administrator via mail" is set as an operation performed when data is input, occurrence of data input is reported via mail to a registered mail address of an administrator.

[Receiving Data at the Network I/F]

Here, in the subject embodiment, the default operation level of the network interface unit 115 is set to "4", and the operation level of the network interface unit 115 for a designated period is set to "4". Since a period from 0:00 to 24:00 is designated, that is, no prohibition period is provided, any operation described above can be always permitted. In addition, nothing is designated as an operation performed when data is input. Obviously, setting can be changed such that when an access exists, mail indicating the existence of the access is transmitted to an administrator, as in the USB interface unit 114.

[Receiving Data at the USB I/F]

In contrast, the default operation level of the USB interface unit 114 is set to "2", and the operation level of the USB interface unit 114 for a designated period is set to "4". In this case, the operable period is set to 9:00 to 17:00. During this period, the operation level is set to "4", and both a setting changing operation and a printing operation can be performed. In contrast, at a time other than the operable period, the operation level is set to "2". At operation level 2, although a response can be made, neither a setting operation nor a printing operation can be performed. When setting changing data or print data is input during a time other than the operable period from 9:00 to 17:00, mail is transmitted to an administrator in accordance with the setting designated as an operation to be performed when data is input.

When receiving data from the host computer 102, the USB interface unit 114 generates an interrupt and reports to the CPU 110 reception of the data from the host computer 102

(step S601). The CPU 110 transfers the received data to the RAM 112 (step S602). After completing data reception, if the interface that receives the data is operable (if the determination in step S603 is YES), the CPU 110 analyzes the received data and detects an operable command, which is assumed as a setting changing command, from the interface (step S605). If the determination in step S603 is NO, mail transmission or the like is performed (step S604).

Next, the CPU 110 checks the current time by referring to the RTC 118. If the current time is within the operable period set in the EEPROM 117 (if the determination in step S606 is YES), the CPU 110 determines that the received data is a setting changing command (the determination in step S607 is YES). If it is determined that the operation level of the interface that receives the data is set to "3" or "4" (if the determination in step S618 is YES), the CPU 110 compares a password indicated after the setting changing command with a password stored in the EEPROM 117 (step S619). If the passwords are equal to each other, the operation level is changed (step S620). Thereafter, the process terminates.

If the received data is not an operable command (if the determination in step S605 is NO), if the current time is not within the operable time (if the determination in step S606 is NO), if the command received by the I/F is not level 3 or 4 (if the determination in S618 is NO) or if the passwords are not equal to each other (if the determination in step S619 is NO), the command is ignored (step S621). Then, mail transmission or the like is performed (step S622) and the process terminates.

When the USB interface unit 114 connected to the host computer 102 receives print data from the host computer 102, the USB interface unit 114 generates an interrupt and reports to the CPU 110 reception of the data from the host computer 102 (step S601). The CPU 110 transfers the received data to the RAM 112, and analyzes the received data stored in the RAM 112 (step S602). After completing data reception, if the interface that receives the data is operable (if the determination in step S603 is YES), the CPU 110 analyzes the received data and detects an operable command, which is assumed as a setting changing command, from the interface (step S605). When it is determined that the received data is an operable command (if the determination in step S605 is YES), if the current time read from the RTC 118 is within an operable period (if the determination in step S606 is YES), the CPU 110 transfers to the RAM 112 data continuously received at the USB interface unit 114. If the CPU 110 determines that the received data is a setting changing command (the determination in step S607 is NO), the process determines whether the received data is print data or not. If a command other than print data is detected (if the determination in step S608 is NO), the process proceeds to another operation. If a print data command is detected (if the determination in step S608 is YES), the process proceeds to step S609.

If the current time is not within the operable period and the interface that receives the command is not set to "3" or "4" (if the determination in step S609 is NO), the received data is overwritten (deleted), and the data is ignored (step S617). Thereafter, the process terminates. If the current time is within the operable period and the interface that receives the command is not set to "3" or "4" (if the determination in step S609 is YES), the process proceeds to step S610.

After completing reception of print data for one page (if the determination in step S610 is YES), the CPU 110 analyzes the print data transferred to the RAM 112, converts the print data into bitmap data using font data stored in the ROM 111, and writes the bitmap data in the RAM 112 (step S612). If the determination in step S610 is NO, the CPU 110 transfers data continuously received at the USB interface unit 114 to the RAM 112 (step S611). After completing creation of bitmap data for one page (step S613), the CPU 110 sets the engine interface unit 119 for a start address or the like of the bitmap data, and starts a printing operation (step S614). If printing for one page is completed (if the determination in step S615 is YES) and printing for one job is completed (if the determination in step S616 is YES), the process terminates.

The engine interface unit 119 communicates with the recording section 121, and outputs video data while measuring timing. The recording section 121 performs a printing operation while turning on and off lasers in accordance with the received video data.

In contrast, if the default operation level of the USB interface unit 114 is set to "3", at a time other than the operable period from 9:00 to 17:00, although a printing operation cannot be performed, a setting changing operation can be performed. When a setting changing command is received during the operable period, a setting changing operation is performed without transmitting mail to an administrator.

As described above, according to the second embodiment, in addition to advantages achieved in the first embodiment, time elements are involved in determination of permission or prohibition of an operation of an interface. For example, when a printer is installed in a public space, a more flexible operation of the printer, such as restriction on a desired operation during a period of time when the number of staffs reduces, can be achieved.

Third Exemplary Embodiment

In the third exemplary embodiment, data received, for example, in step S417 or S413 (FIG. 4) is ignored by deleting the data in the first and second embodiments. When a further non-permitted access is made from an external host computer, usability for users can be further improved by reporting a message indicating an operation level currently set for an interface and a permitted or prohibited operation.

More specifically, a message indicating both a set operation level and a difference between processing required in accordance with an access of data transmitted from a host computer and processing permitted in accordance with the operation level set for the interface is reported.

For example, in a case where an operation level shown in FIG. 3 is set for a printer, when print data is received via the USB interface unit 114, it is assumed that a message "The current operation level is set to "3". Settings of the printer can be performed, but print data cannot be received." is reported from the printer to a host computer from which the print data is transmitted. In addition, such a message is not necessarily reported to a host computer. For example, such a message may be displayed on the panel section 122.

The message to be displayed may be stored as text or image information in the EEPROM 117 so that the message can be read from the CPU 110 and reported.

Other Exemplary Embodiments, Features and Aspects of the Present Invention

The present invention is not limited to the apparatus in the foregoing embodiments. The present invention may be applied to a system including a plurality of apparatuses or may be applied to an apparatus formed by a single device. For example, another apparatus, such as a host computer, may perform processing in a step in the flowchart shown in FIG. 4 or FIG. 6.

In addition, an aspect of the present invention may be achieved by supplying a storage medium on which program code of software for realizing the functions of the foregoing embodiments is stored to a system or an apparatus and by reading and executing the program code stored in the storage medium by a computer (or a CPU or a micro-processing unit (MPU)) of the system or the apparatus.

In this case, the program code itself read from the storage medium attains the functions of the foregoing embodiments, and the storage medium storing the program code constitutes the present invention. The storage medium for supplying the program code may be, for example, a floppy disk, a hard disk, an optical disk, a magneto-optical disk, a CD-ROM, a CD-R, a magnetic tape, a nonvolatile memory card, a nonvolatile memory, or the like. In addition, the functions of the foregoing embodiments can be attained not only by executing the read program code by the computer but also by performing part or all of the actual processing by an OS or the like running on the computer on the basis of instructions of the program code.

Furthermore, the functions of the foregoing embodiments can also be attained by performing part or all of the actual processing by the CPU or the like arranged in a function expansion board of the computer or a function expansion unit connected to the computer on the basis of instructions of the next program code read from the storage medium after the program code is written in a memory of the function expansion board or the function expansion unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-369434 filed Dec. 21, 2004 and No. 2005-330249 filed Nov. 15, 2005, which are hereby incorporated by reference herein in their entirety.

What is claimed is:

1. A printer configured to communicate with an external information processing apparatus, the printer capable of performing plural kinds of processing for data received from the external information processing apparatus, the printer comprising:
   a storage device that stores permission setting information representing whether processing required in accordance with data received from the external information processing apparatus is permitted or not;
   a processor that performs processing for the received data in accordance with the permission setting information stored in the storage device; and
   a transmitter that transmits, in the case that processing required in accordance with the received data is not permitted, a message indicating that the required processing is not to be permitted and that another processing among the plural kinds of processing is to be permitted to the external information processing apparatus which send the data.

2. The printer according to claim 1, further comprising a timer that measures time,
   wherein the storage device stores a correspondence between a time and an operation level, and
   wherein the processor performs the processing for the received data in accordance with a time measured by the timer and with the operation level corresponding to the time stored in the storage device.

3. The printer according to claim 1, further comprising a plurality of interfaces,
   wherein the storage device stores the permission setting information for each of the plurality of interfaces, and
   wherein when receiving data via an interface from among the plurality of interfaces, the processor performs processing for the received data in accordance with permission setting information corresponding to the interface.

4. The printer according to claim 1, wherein setting of the permission setting information is capable of being changed.

5. The printer according to claim 1, wherein the permission setting information is capable of being set in accordance with an instruction input from outside.

6. The printer according to claim 1, wherein the required processing includes processing involving a printing operation and processing not involving a printing operation.

7. A printer configured to communicate with an external information processing apparatus, the printer capable of performing plural kinds of processing for data received from the external information processing apparatus, the printer comprising:
   a storage device configured to store permission setting information on processing required in accordance with data received from the external information processing apparatus;
   a processor configured to perform processing for the received data in accordance with the permission setting information stored in the storage device; and
   a transmitter that transmits, in the case that processing required in accordance with the received data is not permitted, a message indicating that the required processing is not to be permitted and that another processing among the plural kinds of processing is to be permitted to the external information processing apparatus which send the data,
   wherein the permission setting information is capable of being set in accordance with an instruction input from outside.

8. The printer according to claim 7, wherein the required processing includes processing involving a printing operation and processing not involving a printing operation.

9. The printer according to claim 7, further comprising a plurality of interfaces,
   wherein the storage device stores the permission setting information for each of the plurality of interfaces, and
   wherein when receiving data via an interface from among the plurality of interfaces, the processor performs processing for the received data in accordance with permission setting information stored corresponding to the interface.

10. A processing method to be utilized in a printer configured to communicate with an external information processing apparatus, the printer capable of performing plural kinds of processing for data received from the external information processing apparatus, the method comprising:
    storing permission setting information representing whether processing required in accordance with data received from the external information processing apparatus is permitted or not in a storage device;
    processing for the received data in accordance with the permission setting information stored in the storage device; and
    transmitting, in the case that processing required in accordance with the received data is not permitted, a message indicating that the required processing is not to be permitted and that another processing among the plural kinds of processing is to be permitted to the external information processing apparatus which send the data.

11. The processing method according to claim 10, wherein the processing is performed in accordance with an operable time period associated with the permission setting information.

12. The processing method according to claim 10, wherein the printer includes a plurality of interfaces, the method further including, storing the permission setting information for each of the plurality of interfaces, and wherein, when receiving data via an interface from among the plurality of interfaces, performing processing for the received data in accordance with permission setting information set corresponding to the interface.

13. The processing method according to claim 10, wherein setting of the permission setting information is capable of being changed.

14. A processing method utilized in a printer capable of communicating with an external information processing apparatus, the printer capable of performing plural kinds of processing for data received from the external information processing apparatus, the method comprising:

storing permission setting information on processing required in accordance with data received from the external information processing apparatus in a storage device;

performing, by a processor, processing for the received data in accordance with the permission setting information stored in the storage device; and transmitting, in the case that processing required in accordance with the received data is not permitted, a message indicating that the required processing is not to be permitted and that another processing among the plural kinds of processing is to be permitted to the external information processing apparatus which send the data, wherein the permission setting information is capable of being set in accordance with an instruction input from outside.

15. The processing method according to claim 14, wherein the required processing includes processing involving a printing operation and processing not involving a printing operation.

16. The processing method according to claim 14, the printer further including a plurality of interfaces, wherein the storage device stores the permission setting information for each of the plurality of interfaces, and wherein when receiving data via an interface from among the plurality of interfaces, the processor performs processing for the received data in accordance with permission setting information set corresponding to the interface.

17. A computer readable medium containing computer-executable instructions for causing a computer to execute a processing method utilized in a printer configured to communicate with an external information processing apparatus, the printer capable of performing plural kinds of processing for data received from the external information processing apparatus, the computer readable medium comprising:

computer-executable instructions for storing level information representing whether processing required in accordance with data received from the external information processing apparatus is permitted or not in a storage device;

computer-executable instructions for processing for the received data in accordance with the level information stored in the storage device; and computer-executable instructions for transmitting, in the case that processing required in accordance with the received data is not permitted, a message indicating that the required processing is not to be permitted and that another processing among the plural kinds of processing is to be permitted to the external information processing apparatus which send the data.

18. A computer readable medium containing computer-executable instructions for causing a computer to execute a processing method utilized in a printer configured to communicate with an external information processing apparatus, the printer capable of performing plural kinds of processing for data received from the external information processing apparatus, the computer readable medium comprising:

computer-executable instructions for storing permission setting information on processing required in accordance with data received from the external information processing apparatus in a storage device;

computer-executable instructions for performing, by a processor, processing for the received data in accordance with the permission setting information stored in the storage device; and computer-executable instructions for transmitting, in the case that processing required in accordance with the received data is not permitted, a message indicating that the required processing is not to be permitted and that another processing among the plural kinds of processing is to be permitted to the external information processing apparatus which send the data wherein the permission setting information is capable of being set in accordance with an instruction input from outside.

* * * * *